US012633638B2

(12) United States Patent
Haefner et al.

(10) Patent No.: US 12,633,638 B2

(45) Date of Patent: May 19, 2026

(54) DUAL MICROSTRUCTURED ELECTRODES FOR RADIO-FREQUENCY WAVEGUIDE ENGINEERING

(71) Applicant: University of Central Florida Research Foundation, Inc., Orlando, FL (US)

(72) Inventors: Joseph Haefner, Orlando, FL (US); Sasan Fathpour, Winter Park, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 83 days.

(21) Appl. No.: 18/890,159

(22) Filed: Sep. 19, 2024

(65) Prior Publication Data

US 2026/0081335 A1 Mar. 19, 2026

(51) Int. Cl.
*H01P 3/08* (2006.01)

(52) U.S. Cl.
CPC .................................... *H01P 3/081* (2013.01)

(58) Field of Classification Search
CPC ........................................................ H01P 3/081
See application file for complete search history.

(56) References Cited

U.S. PATENT DOCUMENTS

| | | | |
|---|---|---|---|
| 5,150,436 A | 9/1992 | Jaeger et al. | |
| 11,567,353 B2 | 1/2023 | Kharel et al. | |

FOREIGN PATENT DOCUMENTS

| | | | | | |
|---|---|---|---|---|---|
| CN | 106646931 A | * | 5/2017 | ............. | G02F 1/025 |
| CN | 120255184 A | * | 7/2025 | ............. | G02B 6/125 |
| CN | 120539972 A | * | 8/2025 | ............... | G02B 6/34 |
| CN | 120848048 A | * | 10/2025 | | |
| WO | WO-2020181690 A1 | * | 9/2020 | ........... | G02F 1/0316 |

OTHER PUBLICATIONS

Manuel Ackermann et al. "Resonantly enhanced lumped-element O-band Mach—Zehnder modulator with an ultra-wide operating wavelength range". In: Opt. Lett. 48.21 (Nov. 2023), pp. 5623-5626. DOI: 10.1364/ 0L .502324. URL: https://opg.optica.org/ol/abstract.cfmURI=o1-48-21-5623. ?

(Continued)

*Primary Examiner* — Andrea Lindgren Baltzell
*Assistant Examiner* — Kimberly E Glenn
(74) *Attorney, Agent, or Firm* — Troutman Pepper Locke LLP; Joshua L. Jones

(57) ABSTRACT

A system includes a first electrode with a first main portion extending along a longitudinal axis. A plurality of T-shaped sub-electrodes extend laterally from the first main portion with respect to the longitudinal axis. A plurality of inductive sub-electrodes extend laterally from the first main portion with respect to the longitudinal axis. The inductive sub-electrodes interdigitate with the T-shaped sub-electrodes to form an alternating pattern with the T-shaped sub-electrodes in a lengthwise direction with respect to the longitudinal axis. A second electrode with a second main portion extends parallel to the longitudinal axis, with a gap between the second electrode and the T-shaped sub-electrodes.

20 Claims, 11 Drawing Sheets

FIG. 3

(56) References Cited

OTHER PUBLICATIONS

Chunyu Deng et al. “Design and simulation of high modulation efficiency, low group velocity dispersion lithium niobate slow-wave electro-optic modulator based on a fishbone-like grating”. In: Optics Laser Technology 158 (2023), p. 108769. ISSN: 0030-3992. DOI: https://doi.org/10.1016/j.optlastec.2022. 108769. URL: https: // maw . sciencedirect .com/science/article/pii/S003039922200915X.
Shu-Yin Ho and Wen-Jiao Liao. “A delay line based on synthesized coplanar waveguide”. In: 2012 International Conference on Microwave and Millimeter Wave Technology (ICMMT). vol. 1. 2012, pp. 1-4. DOI: 10.1109/ICMMT.2012.6229977.
Xingrui Huang et al. “Advanced Electrode Design for Low-Voltage High-Speed Thin-Film Lithium Niobate Modulators”. In: IEEE Photonics Journal 13.2 (2021), pp. 1-9. DOI: 10.1109/JPHOT.2021. 3066159.
Sean P. Nelan et al. “Integrated Lithium Niobate Intensity Modulator on a Silicon Handle With Slow-Wave Electrodes”. In: IEEE Photonics Technology Letters 34.18 (2022), pp. 981-984. DOI: 10. 1109/LPT. 2022. 3197085.
A. Rosa et al. “Microwave index engineering for slow-wave coplanar waveguides”. In: Scientific Reports 8 (Apr. 2018), p. 1. DOI: 10.1038/s41598-018-24030-w.

* cited by examiner

DUAL MICROSTRUCTURED ELECTRODES FOR RADIO-FREQUENCY WAVEGUIDE ENGINEERING

BACKGROUND

1. Field

The present disclosure relates generally to distribution and control of signals such as radio-frequency (RF) signals, and more particularly to chip-level structures for applications such as RF photonics, RF delay lines, analog/digital signal processing, optical telecommunication and data communication, terahertz imaging, optical interconnects, optical frequency combs, photonics for artificial intelligence, telecommunications, manipulation of photon wave packets, neuromorphic photonics, optical computing, quantum computing and sensing and the like.

2. Description of Related Art

Various technologies for true time delay either rely on photonic up-conversion, and propagation through a low loss media such as a fiber, or by selecting longer routing traces. The photonic up-conversion method would be better enabled by improved modulators. Currently, most high-speed modulators are fabricated on lithium niobate, utilizing the electro-optic effect of the RF field across the optical waveguide. Some modulator innovators utilize either bulk lithium or thin film lithium niobate with standard coplanar waveguides, or T-electrode devices to implement their modulator designs. Lithium niobate is a leading candidate for engineering modulators. Transmission lines also have a host of applications in traditional microwave engineering and radar systems. Particularly, microstrip lines are indispensable devices in RF integrated circuits (RFICs) for connecting antennas and transmitters, for distributing and routing signals, and the like.

The conventional techniques have been considered satisfactory for their intended purpose. However, there is an ever-present need for improved systems and methods for greater engineering flexibility across a variety of platforms for RFICs, photonic integrated circuits (PICs), and the like. This disclosure provides a solution for this need.

SUMMARY

A system includes a first electrode with a first main portion extending along a longitudinal axis. A plurality of T-shaped sub-electrodes extend laterally from the first main portion with respect to the longitudinal axis. A plurality of inductive sub-electrodes extend laterally from the first main portion with respect to the longitudinal axis. The inductive sub-electrodes interdigitate with the T-shaped sub-electrodes to form an alternating pattern with the T-shaped sub-electrodes in a lengthwise direction with respect to the longitudinal axis. A second electrode with a second main portion extends parallel to the longitudinal axis, with a gap between the second electrode and the T-shaped sub-electrodes.

The first electrode can be symmetrical across the longitudinal axis. The plurality of T-shaped sub-electrodes can include a first array of T-shaped sub-electrodes on a first side of the longitudinal axis, and a second array of T-shaped sub-electrodes on a second side of the longitudinal axis opposite the first side. The plurality of inductive sub-electrodes can include a first array of inductive sub-electrodes on the first side of the longitudinal axis, and a second array of inductive sub-electrodes on the second side of the longitudinal axis.

The second main portion of the second electrode can be on the first side of the longitudinal axis spaced laterally apart from the first array of T-shaped sub-electrodes relative to the longitudinal axis. A third main portion of the second electrode can be on the second side of the longitudinal axis spaced laterally apart from the second array of T-shaped sub-electrodes relative to the longitudinal axis.

The first and second electrodes can be co-planar and together form a planar structure. The first and second electrodes can be of a metallic material disposed, deposited, or otherwise located on a planar surface of a semiconductor substrate.

The T-shaped sub-electrodes and the inductive sub-electrodes can be microstructures of the first electrode. For every T-shaped sub-electrode of the first electrode, the second electrode can include an opposed T-shaped electrode microstructure extending laterally therefrom relative to the longitudinal axis. The second electrode can include a plurality of inductive electrode microstructures extending laterally from the second electrode relative to the longitudinal axis. The plurality of inductive electrode microstructures of the second electrode can interdigitate with the T-shaped electrode microstructures of the second electrode to form an alternating pattern with the T-shaped electrode microstructures in a lengthwise direction with respect to the longitudinal axis. The plurality of T-shaped electrode microstructures and the plurality of inductive electrode microstructures can extend laterally inward from each of the first and second main portions of the second electrode relative to the longitudinal axis.

Each of the T-shaped sub-electrodes can include a lateral base extending laterally from the main portion of the first electrode relative to the longitudinal axis and a terminal cross extending laterally from the lateral base. The lateral base can have a first width in a parallel direction that is parallel to the longitudinal axis and a first length in a lateral direction that is lateral relative to the longitudinal axis. The terminal cross can have a second length in the parallel direction and a second width in the lateral direction. The first width and the second width can be equal.

Each of the inductive sub-electrodes can include a linear body, extending laterally from the main portion of the first electrode relative to the longitudinal axis. The linear body can have a third length in the lateral direction and a third width in the parallel direction. The third length can be shorter than the first length. The third width can be equal to the first and second widths, but these widths are not required to be equal, e.g., the top of the T width does not need to match the base of the T-width. Adjacent ones of the plurality of T-shaped sub-electrodes can be spaced apart from one another by a first gap in the parallel direction.

Each inductive sub-electrode can be inside a slot bounded by two longitudinal edges of the first main portion of the first electrode, the lateral bases of two adjacent ones of the T-shaped sub-electrodes, a portion of the terminal cross of a first one of the two adjacent ones of the T-shaped sub-electrodes, a portion of the terminal cross of a second one of the two adjacent ones of the T-shaped sub-electrodes, and the second gap between the portions of the terminal crosses of the first and second ones of the two adjacent ones of the T-shaped sub-electrodes.

Each of the T-shaped electrode microstructures can include a lateral base extending laterally from one of the second or third main portions of the second electrode relative to the longitudinal axis and a terminal cross extending laterally from the lateral base. The lateral base can have the first width in the parallel direction, and a fourth length in the lateral direction. The fourth length can be longer than the first length. The terminal cross of the T-shaped electrode microstructure can have the second width in the parallel direction and the first width in the lateral direction.

Each of the inductive electrode microstructures can include a linear body, extending from one of the second and third main portions of the second electrode relative to the longitudinal axis. The linear body can have a fifth length in the lateral direction and the third width in the parallel direction. The fifth length can be longer than the third length. Adjacent ones of the plurality of T-shaped electrode microstructures can be spaced apart from one another by the first gap in the parallel direction. Each inductive electrode microstructure can be inside a slot bounded by two longitudinal edges of one of the second and third main portions of the second electrode, the lateral bases of two adjacent ones of the T-shaped electrode microstructures, a portion of the terminal cross of a first one of the two adjacent ones of the T-shaped electrode microstructures, a portion of the terminal cross of a second one of the two adjacent ones of the T-shaped electrode microstructures, and the second gap between the portions of the terminal crosses of the first and second ones of the two adjacent ones of the T-shaped s electrode microstructures.

A first slow wave optical guide such as a Bragg grating structure or 2-dimensional crystal waveguide can extend in a parallel direction that is parallel to the longitudinal axis. The first Bragg grating structure can be between the first electrode and the second main portion of the second electrode. A second slow wave optical guide such as a Bragg grating structure can extend in the parallel direction. The second Bragg grating structure can be between the first electrode and the third main portion of the second electrode. An optical source can be included, wherein respective first ends of each of the first and second Bragg grating structures are an optical input that is optically coupled to the optical source. An optical detector can be included. Respective second ends of each of the first and second Bragg grating structures can be an optical output that is optically coupled to the optical detector. An electric signal input module can be configured to generate electrical signals for modulation of an optical signal from the optical source, so the optical detector receives a modulated optical signal based on an electrical signal generated by the electrical signal input module. An electrical circuit can electrically connect the electrical signal input module to the first electrode and can electrically connect the second electrode to an electrical return or ground. The first and second electrodes can be configured to modulate optical signals in the Bragg grating structures based on the electrical signals input thereto from the electric signal input module.

The system can include an electrical transmission line with an electrical signal input electrically connected to a first end of the first electrode relative to the longitudinal axis, and an electrical signal output electrically connected to a second end of the first electrode opposite the first end relative to the longitudinal axis. The first and second electrodes can be configured to provide a true delay in an electrical signal from the electrical signal input to the electrical signal output. The second electrode can be electrically connected to an electrical return or ground. The first and second electrodes can be configured to produce greater than a 100 GHz bandwidth and/or the first and second electrodes can be configured to achieve an on/off optical drive voltage or V_pi of 1 V.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
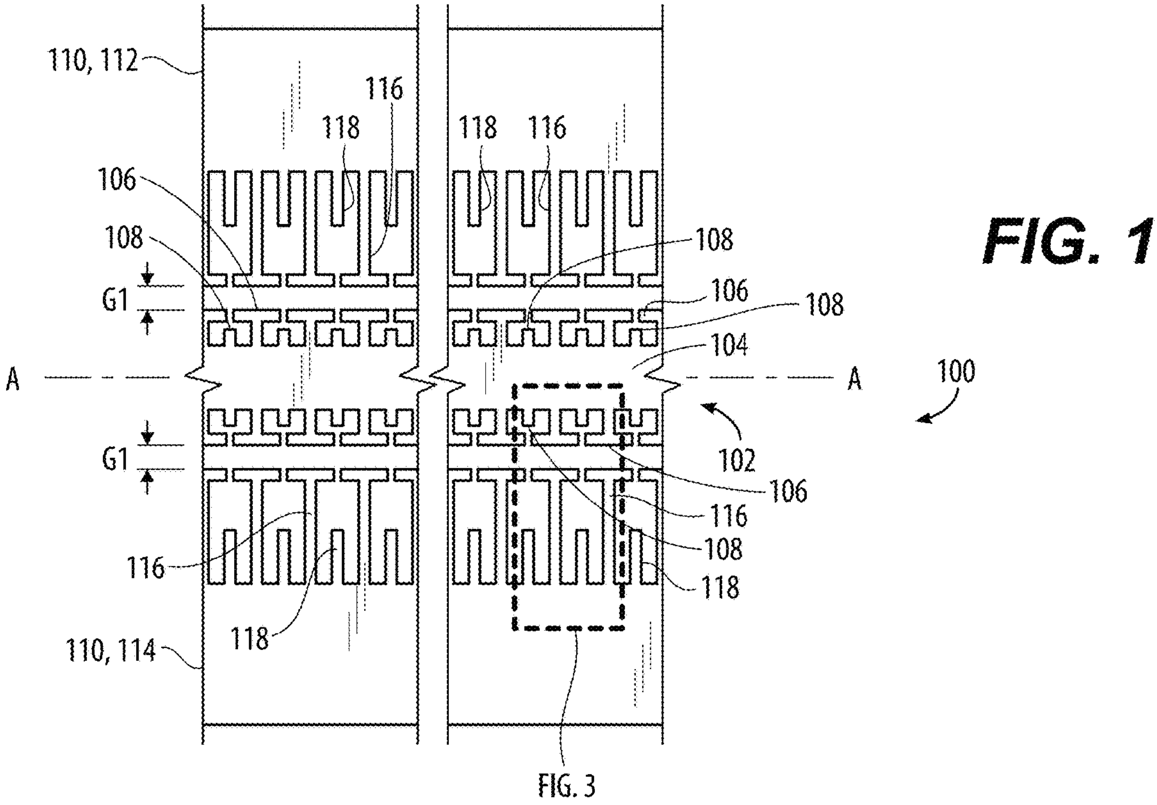
FIG. 1 is a schematic plan view of an embodiment of a system constructed in accordance with the present disclosure, showing the first and second electrodes with dual microstructures.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-14, as will be described. The systems and methods described herein can be used to provide microstructures with geometric parameters that can be tuned for engineering radio-frequency waveguides.

This disclosure is relevant to the distribution, and control of radio-frequency signals on chip-level structures, for applications related to radio frequency (RF) photonics, RF delay lines, analog/digital signal processing, and optical interconnects. It describes the addition of specialized microstructures, e.g., to a traditional coplanar microwave transmission line to enhance the inductive and capacitive properties of the line. These perturbations of the inductive and capacitive parameters provide independent tuning control of the RF effective propagation index, the RF transmission losses, as well as ensure impedance matching, e.g., at 50-ohm, for integration with standard RF drive equipment and loads. The design is focused on a single planar structure to minimize fabrication steps and avoid requirements for gray-scale lithography or multiple lift-off processes. This can serve to streamline the fabrication, enhancing production capability of high-bandwidth devices. The interdigitated T-electrode structure described below can benefit any platform utilizing the electro-optic effect for modulation. It can provide greater engineering flexibility across a variety of platforms, e.g., including lithium niobate platforms and the like.

When coupled with optical gratings as described further herein, such an electrode structure can be used to improve the modulation bandwidth and drive voltage of an optical modulator, e.g., a Mach-Zehnder modulator, to produce devices with greater than 100 GHz bandwidths while operating with standard complementary metal oxide semiconductor (CMOS) control logic. Such devices can achieve an on/off drive voltage of approximately 1 V. The tunability of optical gratings with the improved engineering flexibility of a dual microstructure electrode as disclosed herein can provide a wide design space for optimization on a variety of substrates.

Radio-frequency (RF) transmission lines provide the interconnection of all chip level communications between transistor structures, as well as the board level traces connecting memory, processing, and I-O commands. In the last several decades, these lines' applications have expanded to act as traveling wave electrodes for many photonic devices enabling the flow of internet traffic for server level interconnects as well as long-haul communications over fiber. This disclosure presents a planar transmission line structure which can be engineered to not only reduce interconnect losses, but also serve as an RF delay line for chip, board, and long-haul interconnects. With the introduction of wideband delay lines, chip level routing constraints may be relaxed to avoid race conditions between gates during layout. Additionally, when coupled with optical Bragg grating structures, the optical propagation tunability provides improved device performance in the design of RF photonic devices, by enhanced velocity matching of the optical and radio-frequency wave propagation coefficients. This disclosure highlights that the improvement of velocity matching is incumbent on the optical grating structure and can be decoupled from any changes to RF propagation caused by the addition of the electrode microstructures. The group index of the slow optical waveguide cannot be set to any arbitrary value, since it must be designed to match the effective index of the designed microstructured electrode, as it is inherent to velocity match the optical and RF propagations.

With reference now to FIG. 1, the system 100 includes a first electrode 102 with a main portion 104 extending along a longitudinal axis A. A plurality of T-shaped sub-electrodes 106 extend laterally from the main portion 104 with respect to the longitudinal axis A. A plurality of inductive sub-electrodes 108 extend laterally from the main portion 104 with respect to the longitudinal axis A. The inductive sub-electrodes 108 interdigitate with the T-shaped sub-electrodes 106 to form an alternating pattern with the T-shaped sub-electrodes 106 in a lengthwise direction with respect to the longitudinal axis A. The first electrode 102 is symmetrical across the longitudinal axis A. The plurality of T-shaped sub-electrodes 106 includes a first array of T-shaped sub-electrodes on a first side of the longitudinal axis A, e.g. above the line of symmetry in FIG. 1, and a second array of T-shaped sub-electrodes 106 on a second side of the longitudinal axis A opposite the first side, e.g. below the line of symmetry in FIG. 1. The plurality of inductive sub-electrodes 108 are similarly arrayed on both sides of the longitudinal axis A, although for FIG. 3 the T-shaped electrode microstructures 116 may be offset from the T-shaped sub-electrodes 106.

A second electrode 110 with two main portions 112, 114 extends parallel to the longitudinal axis A. The main portion 112 is on the first side, e.g., the top as oriented in FIG. 1, of the longitudinal axis A spaced laterally apart from the first array of T-shaped sub-electrodes 106 relative to the longitudinal axis A. The main portion 114 is on the second side of the longitudinal axis A, e.g., the bottom as oriented in FIG. 1, spaced laterally apart from the second array of T-shaped sub-electrodes 106 relative to the longitudinal axis A.

The T-shaped sub-electrodes 106 and the inductive sub-electrodes 108 are microstructures of the first electrode 102. For every T-shaped sub-electrode 106 of the first electrode 102, the second electrode 110 includes an opposed microstructure T-shaped sub-electrode, referred to herein as T-shaped electrode microstructures 116, extending laterally therefrom relative to the longitudinal axis A. The second electrode 110 similarly includes a plurality of microstructure inductive sub-electrodes, referred to herein as inductive electrode microstructures 118, extending laterally from the second electrode 110 relative to the longitudinal axis A. The inductive electrode microstructures 118 interdigitate with the T-shaped electrode microstructures 116 to form an alternating pattern in the lengthwise direction with respect to the longitudinal axis A. The T-shaped electrode microstructures 116 and the inductive electrode microstructures 118 extend laterally inward from each of the main portions 112, 114 of the second electrode 110. There is a respective gap G1 between the T-shaped electrode microstructures 116 and the adjacent T-shaped sub-electrodes 106 of the first electrode 102 for each of the first and second portions 112, 114 of the second electrode 110.

Figure 2:
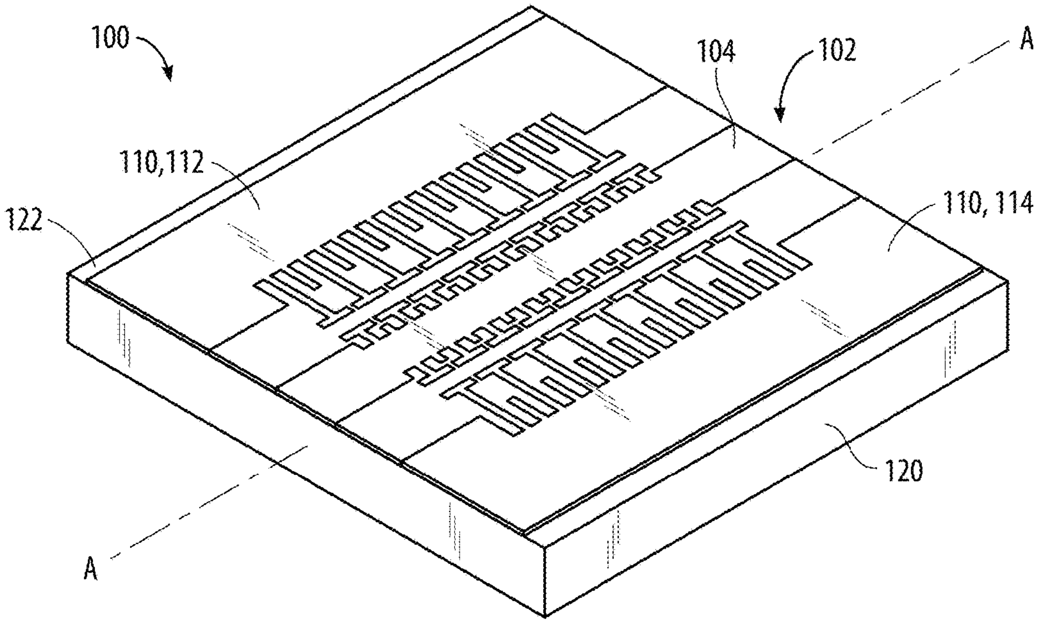
FIG. 2 is a perspective view of the system of FIG. 1, showing the layer of the electrodes on the substrate.

With reference to FIG. 2, the first and second electrodes 102, 110 are co-planar and together form a planar structure. For example, the first and second electrodes 102, 110 can be formed as a patterned layer of a metallic material disposed on a planar surface 120 of a semiconductor substrate 122. Although a set number of microstructures 106, 108, 116, 118 (not labeled in FIG. 2 but see FIG. 1) are shown in FIG. 2, those skilled in the art will readily appreciate that any suitable number of microstructures 106, 108, 116, 118 can be included in a system 100 for a given application without departing from the scope of this disclosure, as indicated by the wavey lines in FIG. 1.

Figure 3:
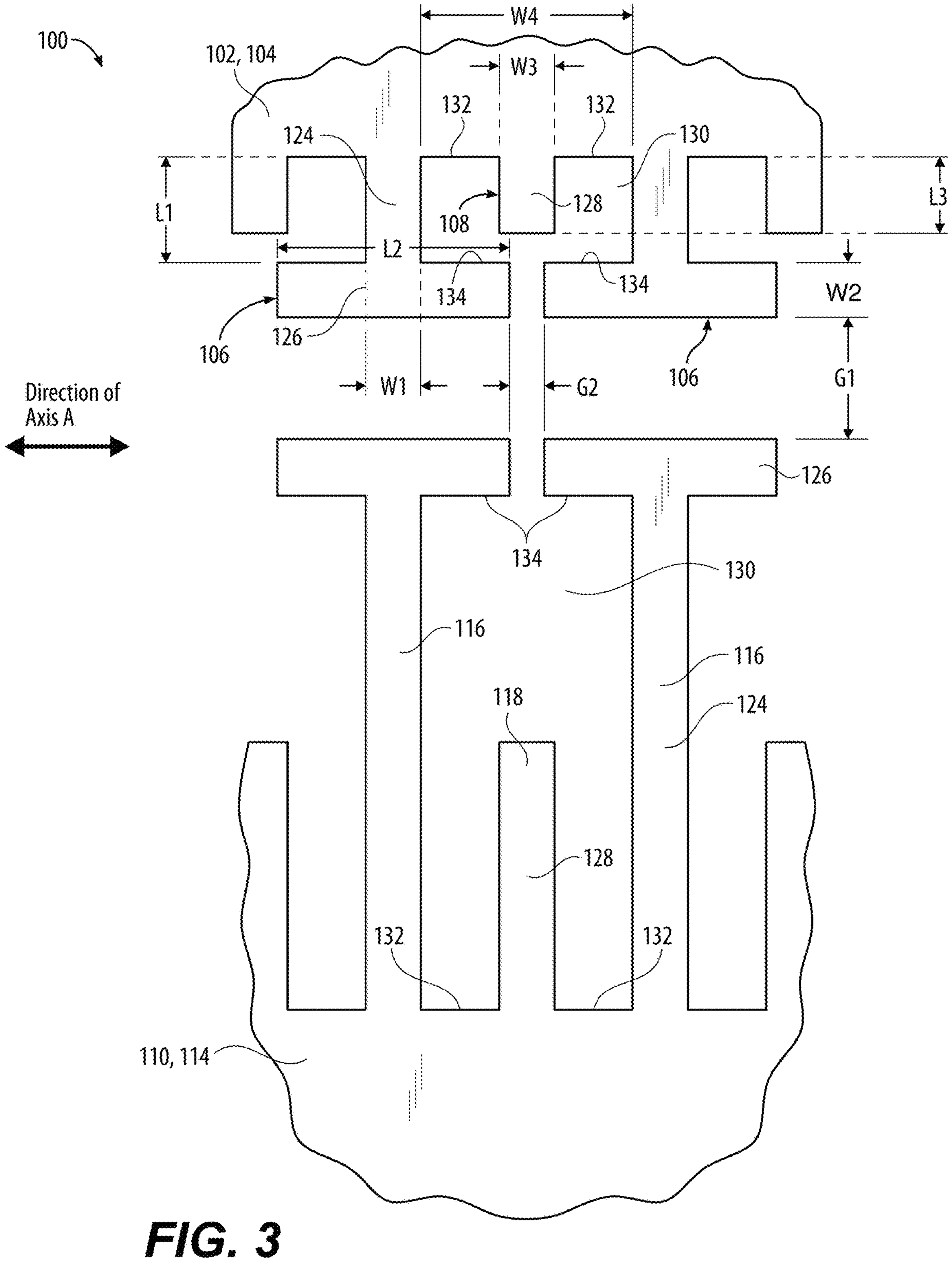
FIG. 3. is schematic plan view of a portion of the system of FIG. 1, showing geometric parameters of the dual microstructures that can be tuned for specific applications.

With reference now to FIG. 3, each of the T-shaped sub-electrodes 106 includes a lateral base 124 extending laterally from the main portion 104 of the first electrode 102 relative to the longitudinal axis A and a terminal cross 126 extending laterally from the lateral base 106. The lateral base has a first width W1 in a parallel direction that is parallel to the longitudinal axis A and a first length L1 in a lateral direction that is lateral relative to the longitudinal axis A. The terminal cross 126 has a second length L2 in the parallel direction and a second width W2 in the lateral direction. The first width W1 and the second width are equal W2. W1 and W2 need not be equal, however they can be. The following relationships is permitted: W4>W3. The following can also be permitted: W1=W2=W3 or else W2<W1 or W1≠W2≠W3.

Each of the inductive sub-electrodes 108 includes a linear body 128, extending laterally from the main portion 104 of the first electrode 102 relative to the longitudinal axis A. The linear body 128 has a third length L3 in the lateral direction and a third width W3 in the parallel direction. The third length L3 is shorter than the first length L1. The third width W3 is equal to the first and second widths W1, W2 but this is not required, as explained above. Adjacent ones of the plurality of T-shaped sub-electrodes 106 are spaced apart from one another by a gap G2 in the parallel direction. There is a fourth width W4 representing the spacing between lateral bases 124 of two adjacent T-shaped sub-electrodes 106.

Each inductive sub-electrode 108 is inside a slot 130 bounded by two longitudinal edges 132 of the main portion 104 of the first electrode 102, the lateral bases 124 of two adjacent ones of the T-shaped sub-electrodes 106, a portion 134 of the terminal cross 126 of each of the two adjacent T-shaped sub-electrodes 106, and the gap G2 between the portions 134 of the terminal crosses 126 of the two adjacent T-shaped sub-electrodes 106. The lengths L1, L2, L3, the widths W1, W2, W3, W4 and the gaps G1, G2 are geometric parameters that can be engineered for specific applications.

With continued reference to FIG. 3, the arrays of T-shaped electrode microstructures 116 and inductive electrode microstructures 118 of the second electrode 110 possess the same structures 124, 126, 128, 130, 132, 134 as those described above with respect to the first electrode 102. These structures 124, 126, 128, 130, 132, 134 of the second electrode 102 define the same engineerable geometric parameters L1-L3, W1-W4, G1-G2 (although not all labeled in FIG. 3 for sake of clarity in the drawings) as those described above with respect to the first electrode 102, albeit the values for those parameters may not be the same values as used for the first electrode. For instance, the lengths L1, L3 can be longer for the second electrode 110 than they are in the first electrode 102. The lateral dimensions of the microstructures associated with the first electrode 102 and the second electrode 110 of FIG. 3 may be equal (equal W2 and L1 values) or the L1 and L3 values of the first electrode 102 may be less than the L1 and L3 dimensions of the second electrode 110. This can be done to improve the mode overlap between the probe pad region and transmission line region of the structure. With the aforementioned parameters, the inductance and capacitance of the first and second electrodes 102, 110 can be tuned for a given application by designing the slots 130 for each electrode 102, 110 wherein the geometric parameters described above are design variables.

Figure 4:
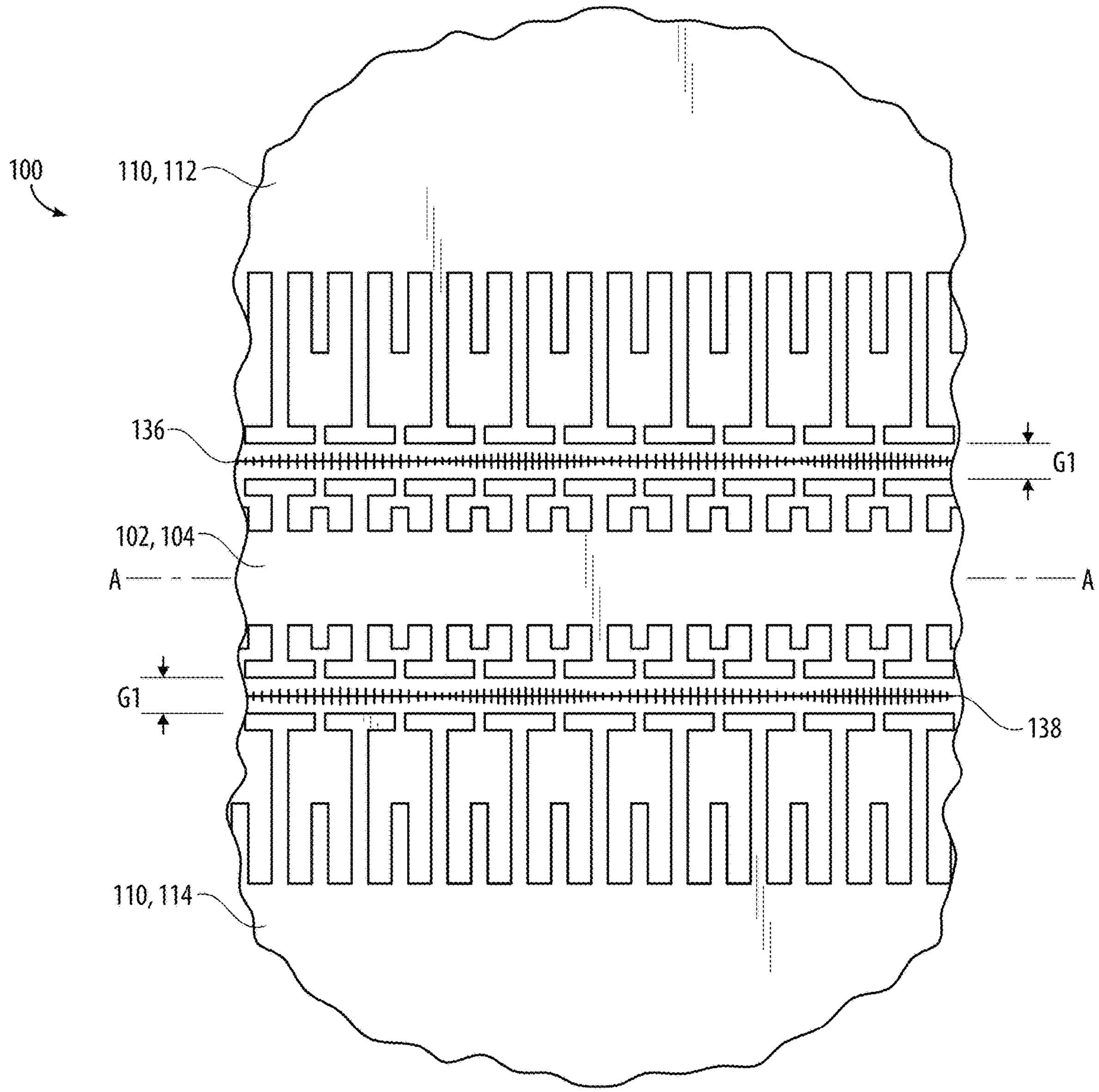
FIG. 4 is a schematic plan view of the system of FIG. 1, showing Bragg grating structures disposed between the electrodes for optical signal modulation.

With reference now to FIG. 4, in modulator applications, a first Bragg grating structure 136 extends in a parallel direction to the longitudinal axis A. The first Bragg grating structure 136 is between the first electrode 102 and the main portion 112 of the second electrode 110. A second Bragg grating 138 structure extends in the parallel direction between the first electrode 102 and the main portion 114 of the second electrode 110 in applications of amplitude modulation, e.g. dual arm intensity modulators implemented with cascaded Bragg gratings. Otherwise a single waveguide 136 may be implemented in either the upper or lower gap G1 for phase modulation. Each of the Bragg grating structures extends lengthwise through a respective one of the gaps G1. The system 100 can include an optical source 139. Respective first ends 140 of each of the first and second Bragg grating structures 136, 138 serve as an optical input 142 at a first end of the first and second electrodes 102, 110 relative to the longitudinal axis A, e.g., on the lower left as oriented in FIG. 5. This optical input 142 is optically coupled to the optical source 139. An optical detector 144 can also be included. However, as discussed below with respect to FIGS. 12 and 13, other uses can be made of the optical output 148 besides optical detectors.

Figure 5:
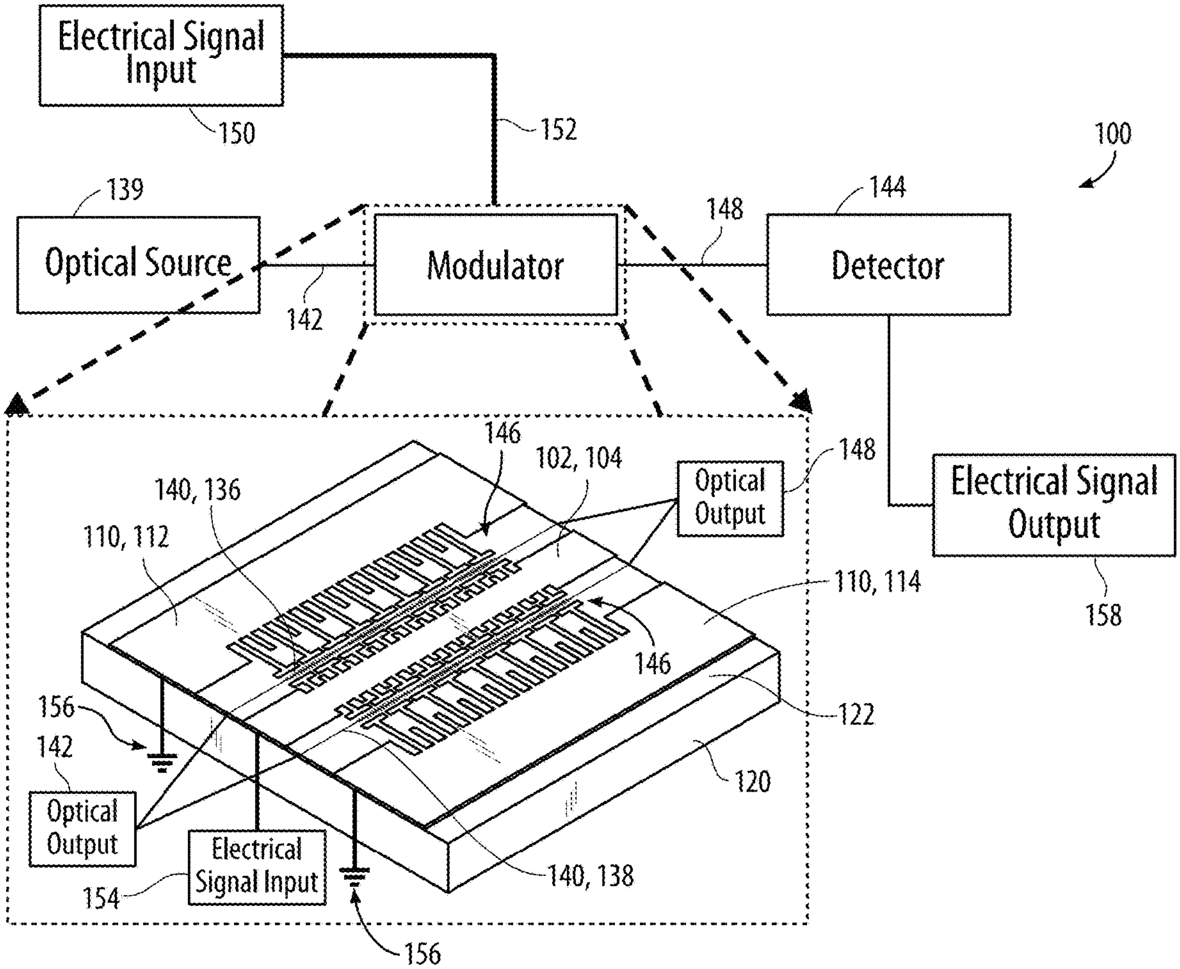
FIG. 5 is a schematic view of the system of FIG. 4, showing system components for optical signal modulation.
Figure 11:
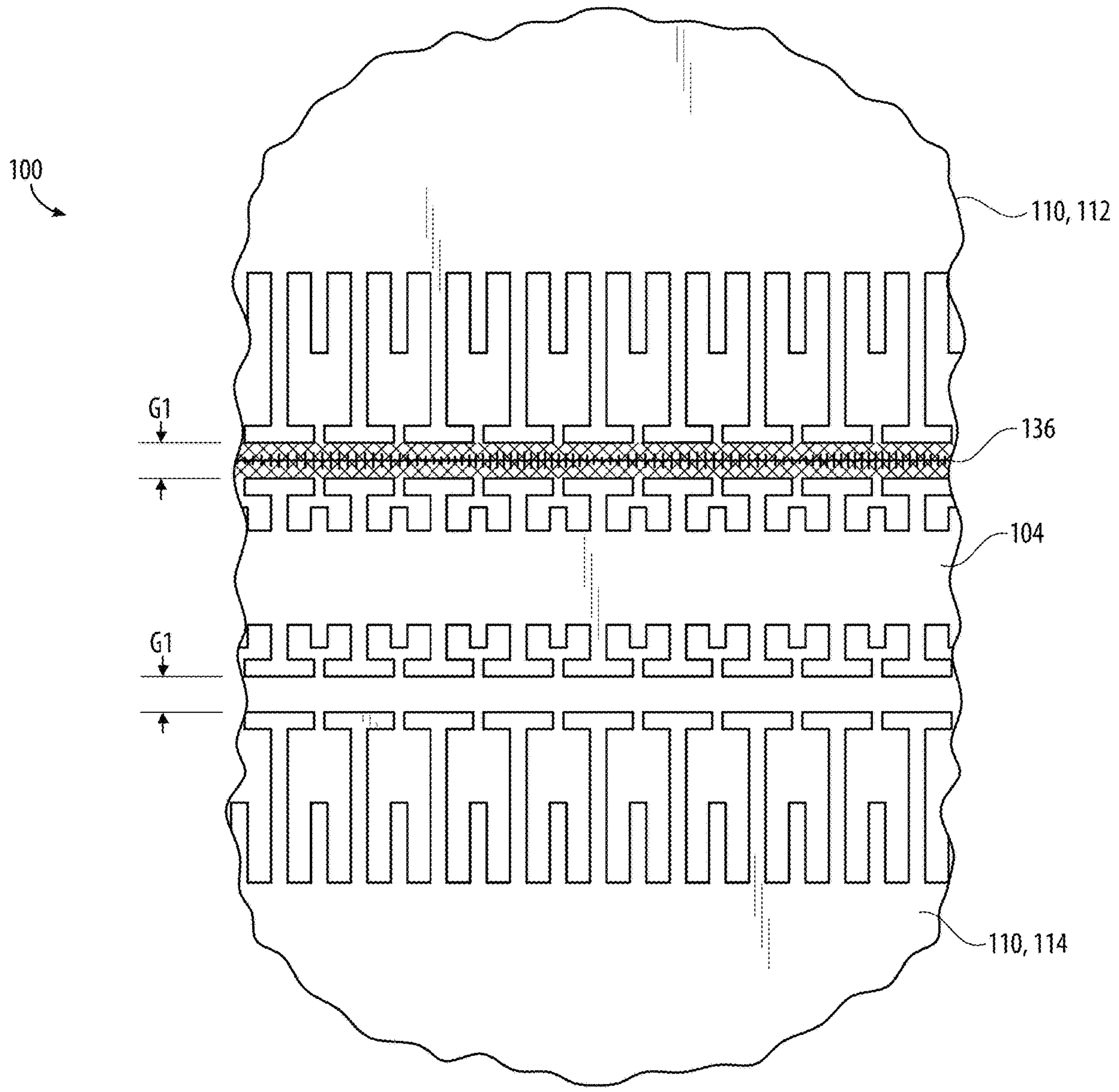
FIG. 11 is a schematic plan view of the system of FIG. 4, showing a configuration with only one optical waveguide in only one of the gaps.

Respective second ends 146 of each of the first and second Bragg grating structures 136, 138 serve as an optical output 148 that is optically coupled to the optical detector at a second end of the first and second electrodes opposite the first end relative to the longitudinal axis A. An electric signal input module 150 is configured to generate electrical signals for modulation of an optical signal from the optical source 139 so the optical detector 144 receives a modulated optical signal based on an electrical signal generated by the electrical signal input module 150. An electrical circuit 152 electrically connects the electrical signal input module 150 to the first electrode 102, e.g., where the electrical signal input 154 is shown in FIG. 5. The circuit 152 also electrically connects both main portions 112, 114 of the second electrode 110 to an electrical return or ground 156. The first and second electrodes 102, 110 are configured to modulate optical signals in the Bragg grating structures 136, 138 based on the electrical signals input thereto from the electric signal input module 150 by way of interaction of the electrical fields in the gaps G1 (labeled in FIG. 4) interacting with the respective Bragg grating structures 136, 138. The detector 144 can produce electrical signals based on the modulated optical signals received by the detector 144 from the optical output 148. These electrical signals can be communicated to downstream components as an electrical signal output 158 from the detector 144. As shown in FIG. 11, it is also contemplated that in suitable applications, there can be only one gap, e.g., G1, having a Bragg grating structure 136, e.g., where there is no Bragg grating structure in the second gap G2.

Figure 12:
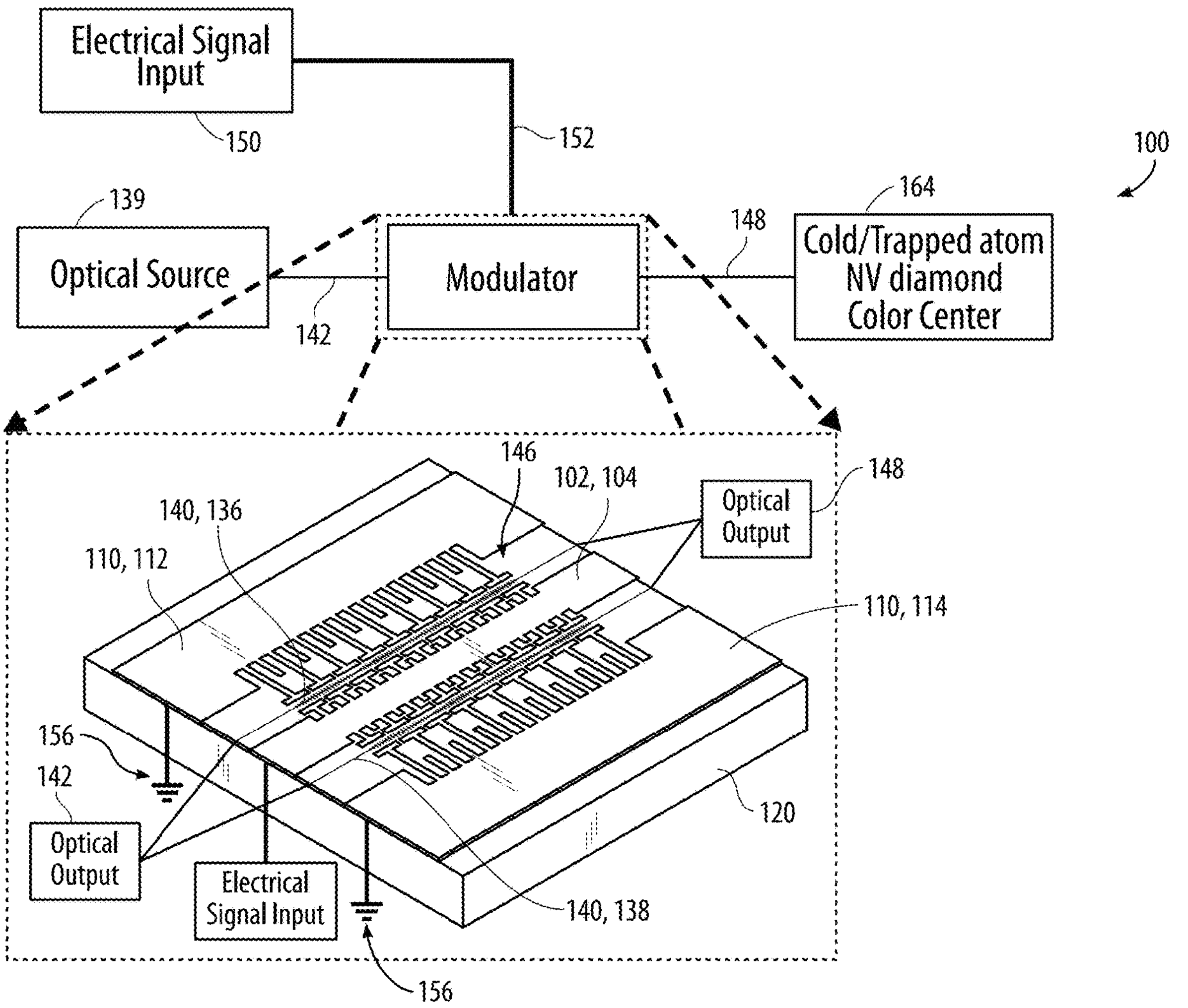
FIG. 12 is a schematic view of the system of FIG. 5, showing a quantum sensing/computing application of the optical output.
Figure 13:
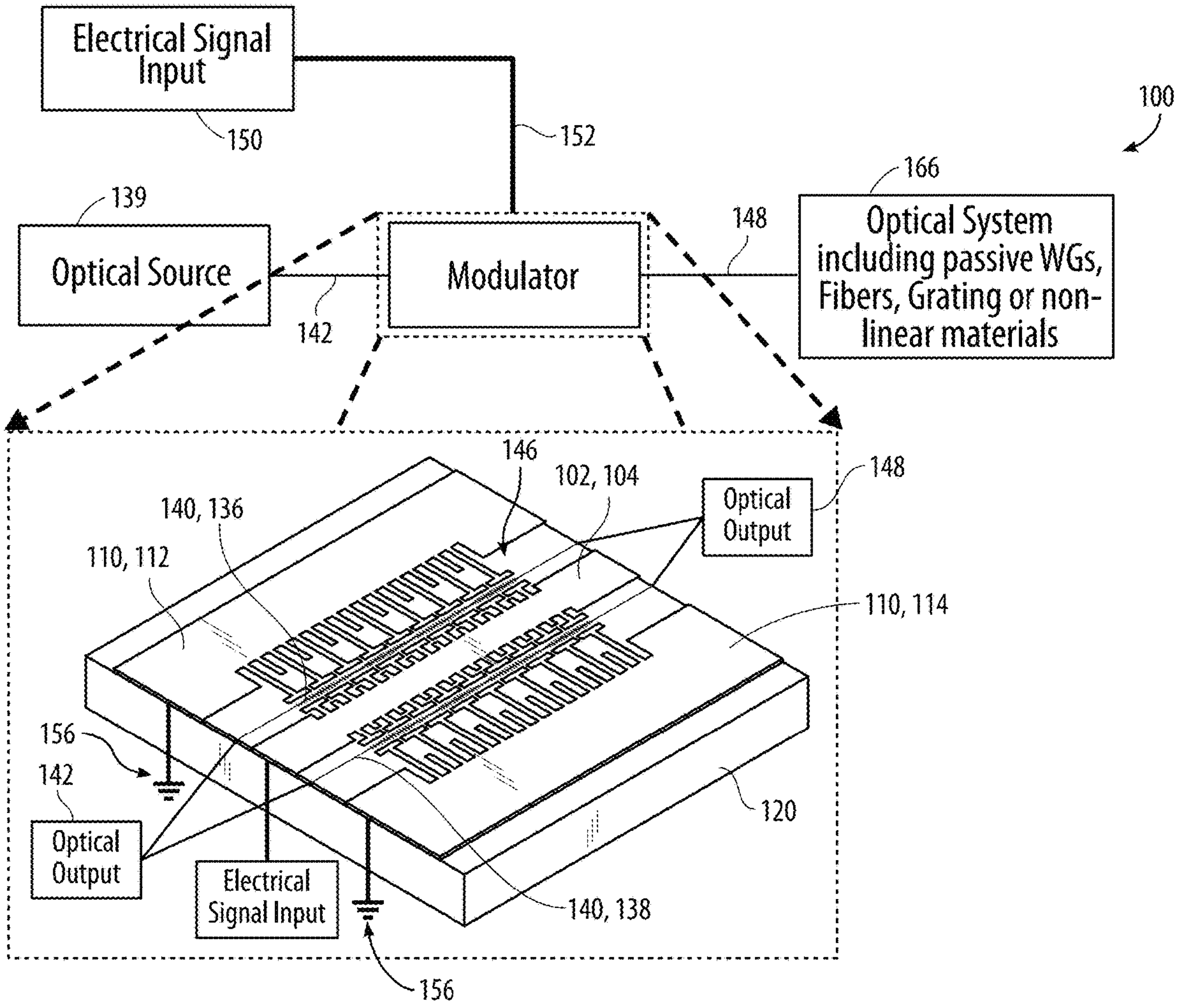
FIG. 13 is a schematic view of the system of FIG. 5, showing an optical computing application for the optical output.
Figure 14:
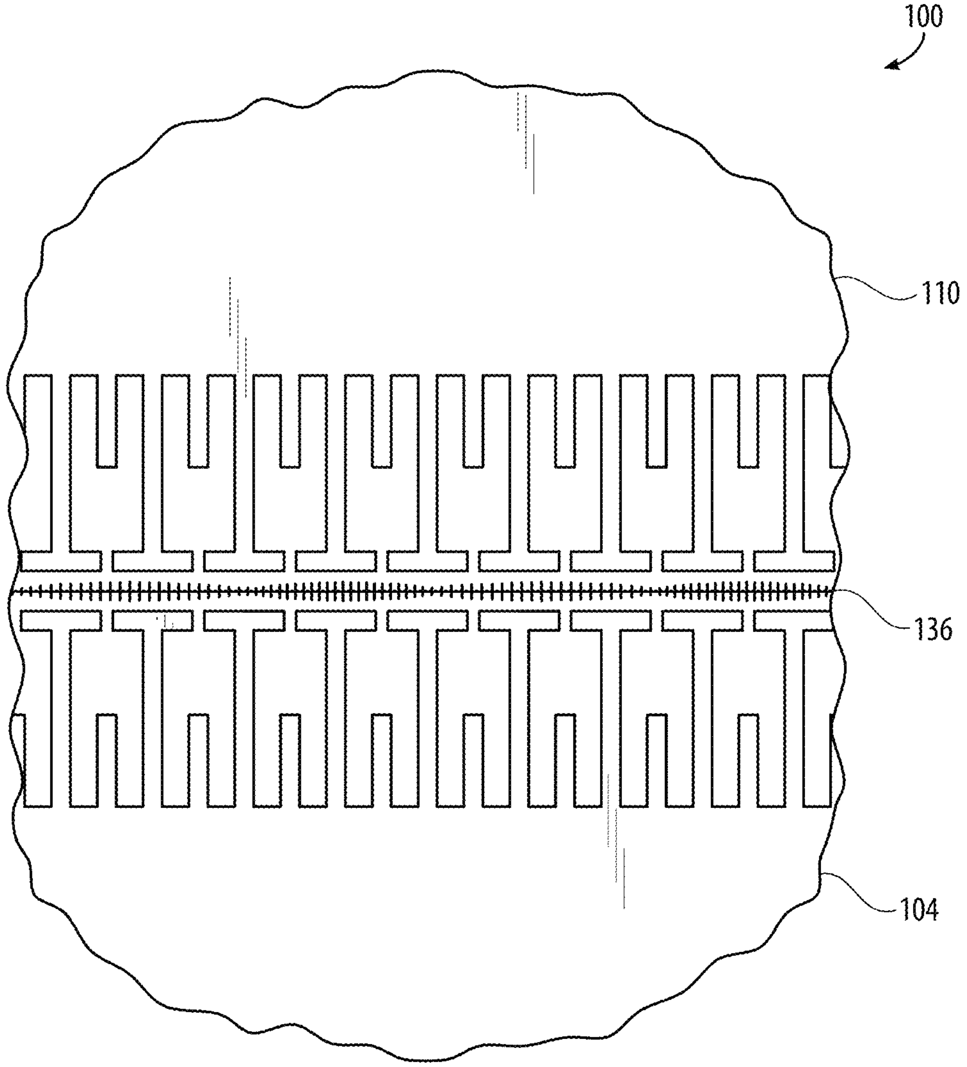
FIG. 14 is a schematic plan view of the system of FIG. 4, showing a configuration with a slot waveguide enhancement for phase modulation.

With reference now to FIG. 12, in lieu of the detector 144 of FIG. 5, any other suitable use can be made of the optical output 148, such as in a cold/trapped atom nitrogen-vacancy (NV) diamond color center 164 component for quantum sensing and/or computing. Similarly, with reference to FIG. 13, an optical system including passive wave guides (WGs), fibers, gratings, or non-linear materials can be optically connected to utilize the optical output 148. Those skilled in the art will having had the benefit of this disclosure will readily appreciate that any other suitable use can be made of the optical output 148 without departing from the scope of this disclosure. Moreover, any suitable type of waveguide, besides a Bragg grating, can be used, e.g. a 2-dimensional photonic crystal structure.

The greater control over the transmission line design disclosed herein has significant impact on microwave-photonic modulators which require three key elements: low loss, high field confinement, and velocity matching, to achieve wide-bandwidth and low drive voltage devices. As further discussed in below with reference to FIGS. 8-10, the interdigitated T-electrode structure provides satisfactory improvements to the loss while maintaining similar performance for the field confinement. While a significant number of previous efforts have focused on the use of microstructures to match the optical propagation index, this disclosure described the opposite, and provides for design of an electrode that can be optimized to minimize loss while reducing the electrode's phase velocity. By reducing the RF phase velocity in a slow wave device, the effective interaction length of the RF signal with the optical pulse can be improved. The modulation enhancement factor of from the reduction in phase velocity can be applied as $$f_{enhancement} = \left(v_{cpw}/v_{SW}\right)^{2/3}.$$

Subsequently, this disclosure describes how the inclusion of cascaded optical gratings can provide an optical pass-band with a group velocity matched to that of the electrode's phase velocity. Additionally, as a requirement for a wide ripple-free RF bandwidth, the pitch of the microstructures must be much smaller than the minimum RF-wavelength around which the device is designed to operate. Accordingly, a pitch of 20-50 μm can be used depending on operating frequencies.

Figure 6:
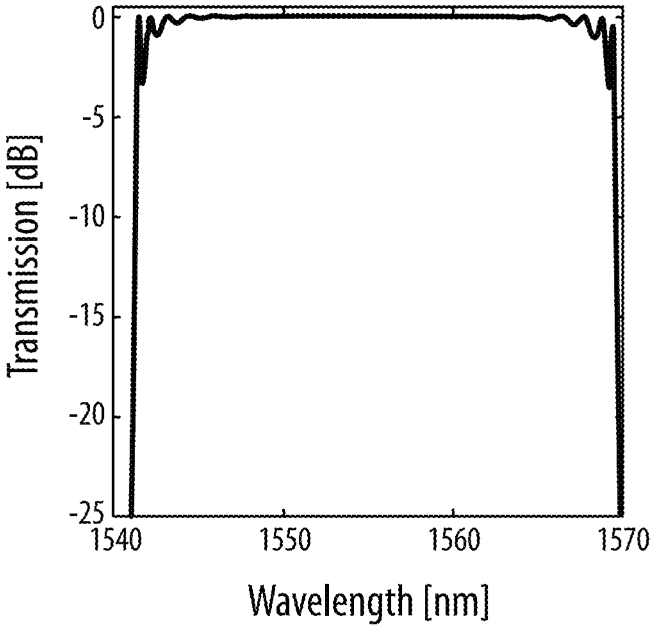
FIG. 6 is a graph showing an example of wavelength versus transmission for the system of FIG. 5.
Figure 7:
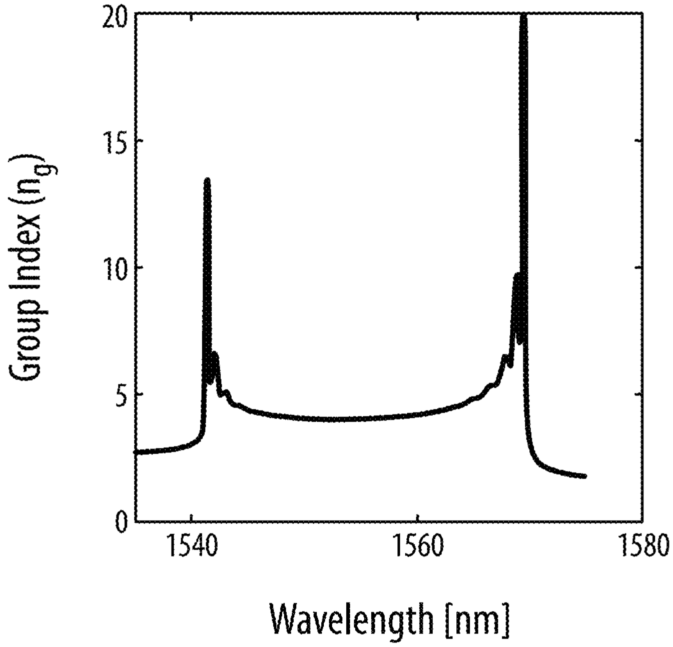
FIG. 7 is a graph showing an example of wavelength versus group index for the example of FIGS. 5-6.

The improved modulation performance disclosed herein can be realized with the addition of an optical Bragg grating to the structure as shown in FIG. 4. This Bragg structure serves to velocity match the both the RF and optical propagation velocities. By cascading two adiabatically apodized gratings, a pass band can be established with a pre-defined group velocity. A non-limiting example of such a Bragg structure is shown in FIGS. 6-7, demonstrating a greater than 15 nm optical bandwidth with a group index of 4.1. Such a structure can result in a 2.5× enhancement factor of the modulation efficiency. This novel combination of dual microstructured electrodes with cascaded apodized-Bragg gratings can provide improved drive voltage tailored to CMOS control logic while still maintaining greater than 100 GHz performance.

Without the inductive microstructures disclosed herein, leveraging repetitive RF-structure's grating pitch utilizing longer T-electrodes to operate near the RF Bragg-stopband edge to generate slow wave electrodes provides good field confinement and a modulation enhancement factor to diminish the drive voltage, but the band edge of the repeating electrode structure diminishes the devices effective bandwidth, only permitting velocity matching in a narrow window centered around the RF carrier frequency. It also generates resonances in the transfer function of the modulator. As stated herein for ultra-wide bandwidth with low drive voltage the pitch of microstructured electrodes may need to be shortened to ensure the RF frequencies remain well below the Bragg frequency.

Finally, all electro-optic structures will require the connection to drive electronics, although it need not solely rely on drive electronics as stated below, direct drive from an antenna element can provide direct modulation onto the optical carrier from broadcast RF signals. Typically, connection to drive electronics accomplished using wire bonding pads, or probe pads. Because the electrode gap and waveguide signal "bus" size are no longer the sole control over the impedance, e.g., as in FIG. 9, the size can be tailored around the probe pad pitch design. This alleviates some of the electrode tapers commonly utilized in electro-optic devices, reducing the overall length of the of the structure. Typically an adiabatic taper is required between the larger dimension ground-signal-ground (GSG) probe pads and the smaller dimensioned transmission line due to the dependence of the "bus" signal electrode and the electrode gap. The inclusion of the dual-structured inter-digitated T-electrodes disclosed herein decouples this dependence allowing the transmission line's dimensions to perfectly match the GSG probe pitch as shown in FIG. 5, which can be a slow wave modulator for broadband devices requiring low drive voltages. The electrical signal input can be any signal, analog RF or digital, which may be derived from a CMOS electronic driver, voltage amplifier, or antenna. The optical input can be any optical signal. Such optical signal sources include, but are not limited to mode locked lasers, optical comb sources, continuous wave lasers, super-luminescent diodes, or single/entangled photon sources.

Figure 8:
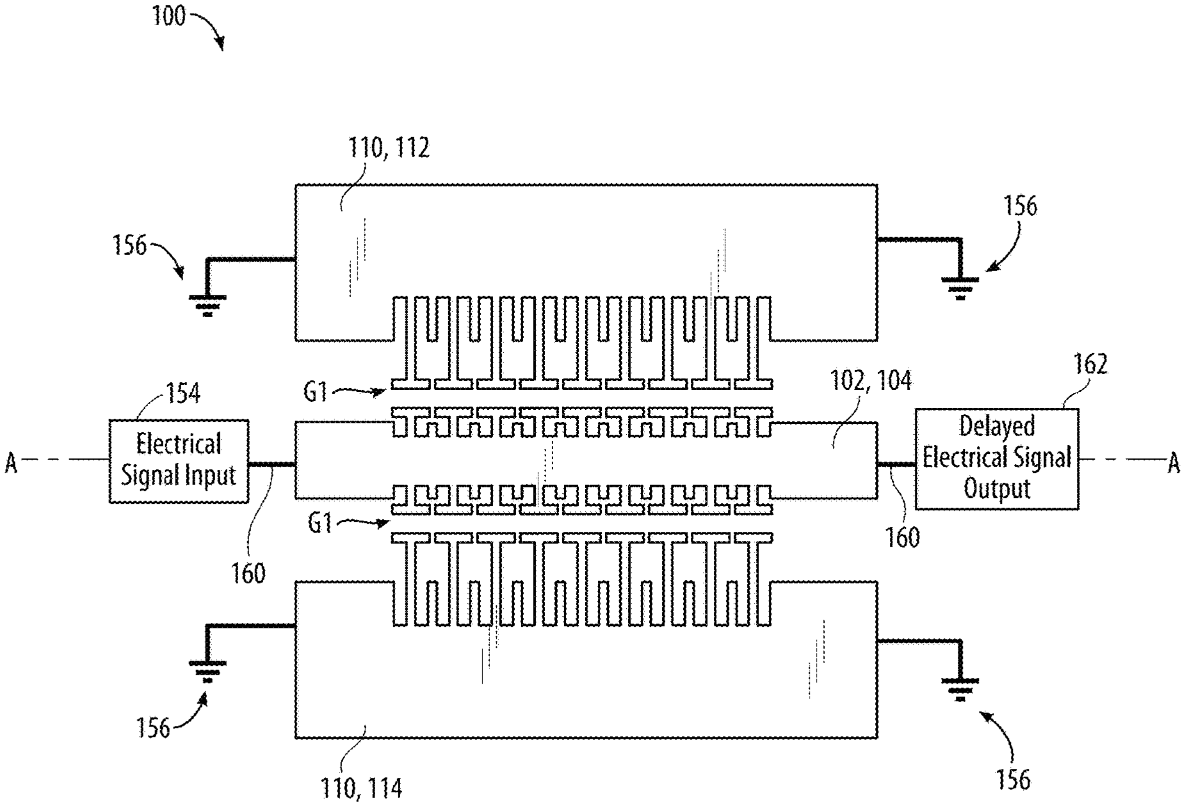
FIG. 8 is a schematic plan view of the system of FIG. 1, showing a circuit configuration for using the electrodes in a transmission line.

With reference now to FIG. 8, in another exemplary application, the system 100 can include an electrical transmission line 160 with an electrical signal input 154 electrically connected to a first end of the first electrode 102 relative to the longitudinal axis, e.g., on the left end as oriented in FIG. 8. The transmission line 160 can include an electrical signal output 162 electrically connected to a second end of the first electrode 102 opposite the first end relative to the longitudinal axis A. Those skilled in the art will readily appreciate that the transmission line 160 on either side of the first electrode 102 need not follow the longitudinal axis A. The first and second electrodes 102, 110 are configured to provide a true delay in an electrical signal from the electrical signal input 154 to the electrical signal output 162, e.g., for chip and board level transmissions such as between memory, clock, or processor. Both main portions 112, 114 of the second electrode 110 can be electrically connected to an electrical return or ground 156.

Figure 9:
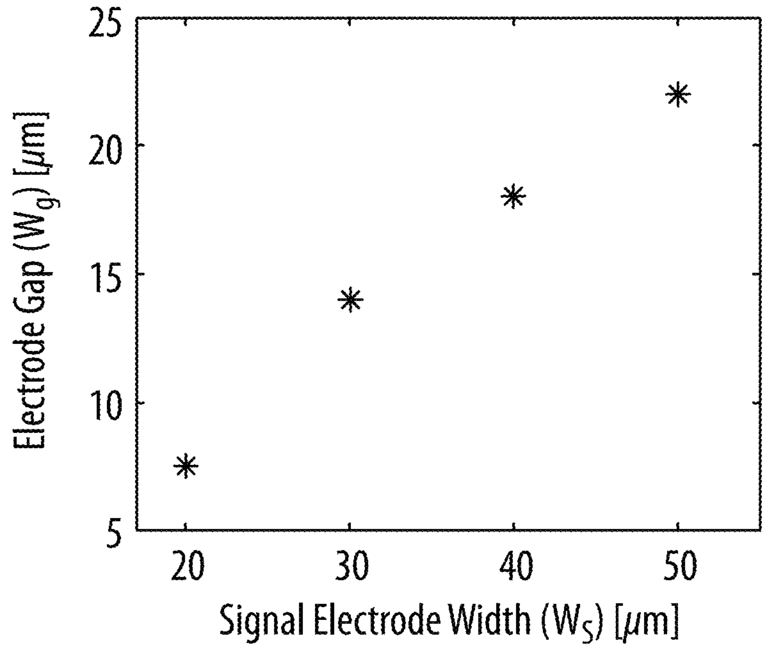
FIG. 9 is a graph showing signal electrode width versus electrode gap, where the points demonstrate the traditional electrode gap as a dependent variable of the central electrode width if a 50Ω line is maintained.
Figure 10:
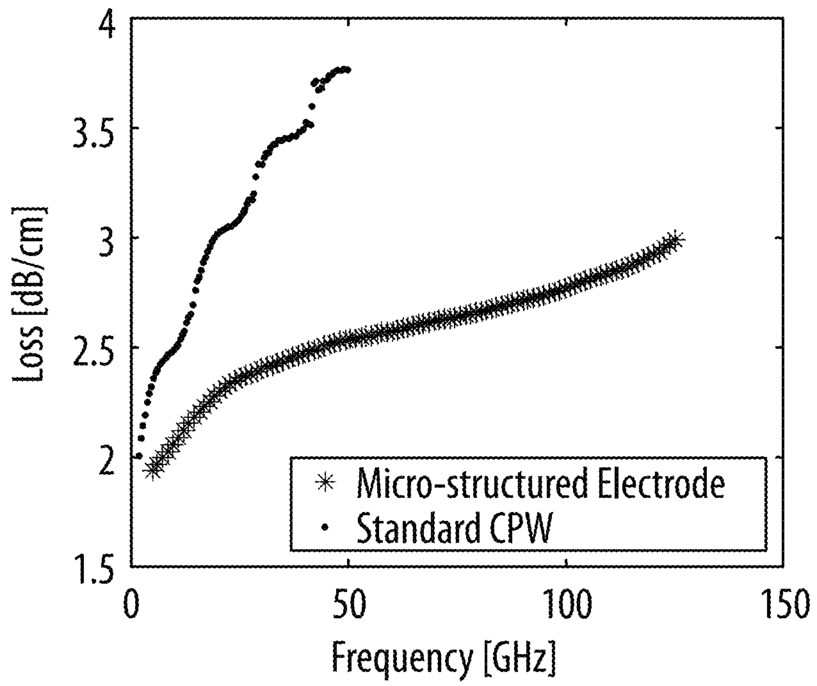
FIG. 10 is a graph showing frequency versus loss for an example of the system of FIG. 1 and for a standard coplanar radio frequency waveguide (CPW)

Transmission lines can be modeled using the telegrapher's equation which describes the transmission line as a RLC circuit defined per unit length which determine the three defining properties of the line, the loss, the propagation constant, and impedance. To avoid reflections and ensure efficient transmission of information, the loss can be minimized while ensuring the impedance matches the termination and source to avoid reflections. This is historically done by controlling the physical dimensions of the line, and the substrate configuration. The loss, and impedance can be the optimized parameters, leaving the RF index set by the substrate and electrode configuration. Typically to reduce resistive losses, a wider signal electrode is used. Traditionally, with an increase in the signal electrode dimension, the gap between the ground and signal electrodes must be increased as seen in FIG. 9. FIG. 9 represents traditional configurations in which the electrode gap G1 is a dependent variable based on the electrode width of the first electrode 102. This traditionally limited the ability to control field confinement while maintaining 50 (2 impedance. This disclosure demonstrates the ability to maintain the electrode gap for a wide variety of widths of the first electrode 102. This leads to the result of FIG. 10 where the RF losses are reduced to the larger electrode width of the first electrode 102 for the same electrode gap. This wider gap increases the radiative losses of the line, however the inclusion of the microstructures disclosed herein can provide superior confinement of the field. The reduced loss from the inclusion of the electrode microstructures is shown in FIG. 10 for a system with the microstructures disclosed herein, as well as for a standard system that does not include the microstructures disclosed herein.

While the reduction of transmission losses is desirable, the addition of microstructures provides an additional degree of freedom when designing a transmission line, permitting the engineer to tune all three parameters. T-electrode microstructures alone do not serve to independently control either inductance or capacitance. Therefore, any change to the T-electrode alone will detrimentally detune the line away from the desired resistance value, e.g., 50-ohm. Inclusion of dual microstructured electrodes (with both the T-shaped microstructures and the inductive microstructures described above) alleviates this constraint by removing the capacitive dependance. The addition of inductive digits between the T-electrodes as shown in FIG. 1 permits the designer to independently control the inductance with no effect to the capacitance. The independence of designing the T-electrode around a given capacitance and inter-leaved digits control of the inductance allows for impedance matching over a variety of propagation coefficients. This total dual microstructure shown in FIG. 2 is referred to herein as an inter-digitated T-electrode, and it provides a novel design concept, permitting wider control of the phase velocity which can be tuned in a manner agnostic to the substrate configuration. This demonstrates that transmission lines can serve as engineered true time delays for signal routing with reduced losses. Design of slow wave electrodes for chip and board level transmissions can now utilize a true temporal delay. Specific applications involve the design of the traces of the electrodes 102, 110 within system level architecture to provide a true time delay. Such a design is relevant to signal propagation in clock distribution or memory allocation to avoid race conditions, for example.

Systems and methods as disclosed herein provide potential benefits including but not limited to the following. They can improve on conventional configurations to provide much greater flexibility in the electrode architecture. Not only are the waveguide gaps and bus-dimensions decoupled allowing for better field confinement, but the additional interdigitated T-electrodes can provide independent tuning of the inductive and capacitive values of the transmission line. This can provide a device with low RF-loss, high field confinement, and impedance matching across a variety of propagation velocities which can be tailored to desired substrate materials. All these benefits can be achieved without the use of multiple metallization stacks, or deep etch undercutting of the substrate providing a novel addition to semiconductor design stack configurations. When coupled with an optical Bragg grating significant performance improvements can be achieved in optical modulators.

The dual microstructured electrode, including interdigitated T-electrodes can be compatible with a single metallization lift-off step to improve device through-put, as well as improve performance over standard bus-design coplanar waveguides. When coupled with optical Bragg gratings the total structure can provide a completely novel concept to provide wide bandwidth low drive voltage modulators.

The market for data centers constantly drives for improved solutions to improve bandwidth performance, while reducing energy consumption. The systems and methods disclosed herein with a dual microstructured electrode combined with optical Bragg gratings can reduce the energy per bit consumption for server-to-server communication as well as for long-haul transmission between data centers.

With the significant drive voltage reduction provided by the combination of Bragg gratings with the dual-microstructure electrode, chip-to-chip level communications can be enabled without changing any of the standard CMOS drive electronics. Another potential advantage is that power hungry wide bandwidth RF amplifiers are not required to amplify the traditional 3.3V signals produced by standard CMOS electronics. Additionally, because this electrode design can be substrate agnostic, it is suitable for integration with a variety of platforms including thin film lithium niobate (TFLN) on insulator or TFLN on silicon. This permits fabrication and integration with silicon electronics and silicon photonics. Plasmonic devices also rely on velocity matching of RF signals to surface plasmons, which can be more easily matched utilizing the dual microstructures disclosed herein.

The conventional board and chip level distribution of signals achieved through strip waveguides have a finite bandwidth and loss trade-off. The systems and methods disclosed herein can have lower loss signal routing and can enable higher clock speeds. This can be the case with systems and methods as disclosed herein due to the larger footprint of microstructured transmission lines. This can provide approaches for more sensitive analog RF sensor distribution across wide-bands of the transmission spectrum. However, it can potentially still be susceptible to compression limiting the dynamic range of the sensor.

Traditional optical modulator devices can suffer from large drive voltages, which can only be addressed by making the device longer, reducing bandwidth. The systems and methods disclosed herein provide a dual microstructure electrode to RF with a velocity matched optical Bragg grating, which can improve all three design criteria for high bandwidth low drive voltage modulators. This can provide a path forward to achieve drive voltages supplied by CMOS logic at greater than 100 GHz bandwidth, which is yet to be realized by conventional techniques in the industry. Additionally, the systems and methods disclosed herein can be designed around a simplistic fabrication technique which can be easily integrated with standard foundry processes. This can avoid any additional complicated multi-layer lift-offs or secondary patterning of electrode structures.

Systems and methods as disclosed herein have the potential to make significant impact in the telecom and data-center industries. As stated earlier, with the constantly increasing demand for higher data-capacities and storage retrieval, low power data transmission with high bandwidths will be an ongoing challenge. The systems and methods as disclosed herein provide a solution that is significant step forward for commercialized terabit per second (Tb/s) networks. The proposed structure can have applications in quantum photonics, as well as distributed sensors. Because the disclosed structures can be purely planar and only require one deposition and lift-off step, they can be easily integrated into the metallization design stack for foundry design rules. The simplicity of the systems and methods disclosed herein provides a direct path for integration into foundry processes without violating design criteria within previously designed process design kits (PDKs).

Systems and methods as disclosed here may in some applications have larger physical lateral dimensions than in conventional configurations. For board and chip-level traces, the benefits of such an increased dimension in some applications may be outweighed by the device real-estate which could be occupied by other devices. Instead, in such applications they may be best used to route specific critical signals, or in conjunction with optical devices to produce low drive-voltage modulators. Such devices already occupy similar footprints, and therefore the electro-optic modulator configurations disclosed herein do provide the potential for immediate adoption and replacement of conventional modulators designed around the electro-optic effect.

The methods and systems of the present disclosure, as described above and shown in the drawings, provide for microstructures with geometric parameters that can be tuned for engineering radio-frequency waveguides. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:

a first electrode with a first main portion extending along a longitudinal axis, wherein a plurality of T-shaped sub-electrodes extend laterally from the first main portion with respect to the longitudinal axis, and wherein a plurality of inductive sub-electrodes extend laterally from the first main portion with respect to the longitudinal axis, wherein the inductive sub-electrodes interdigitate with the T-shaped sub-electrodes to form an alternating pattern with the T-shaped sub-electrodes in a lengthwise direction with respect to the longitudinal axis; and a second electrode with a second main portion extending parallel to the longitudinal axis, with a gap between the second electrode and the T-shaped sub-electrodes.

2. The system as recited in claim 1, wherein the first electrode is symmetrical across the longitudinal axis, wherein the plurality of T-shaped sub-electrodes includes a first array of T-shaped sub-electrodes on a first side of the longitudinal axis, and a second array of T-shaped sub-electrodes on a second side of the longitudinal axis opposite the first side, and wherein the plurality of inductive sub-electrodes includes a first array of inductive sub-electrodes on the first side of the longitudinal axis, and a second array of inductive sub-electrodes on the second side of the longitudinal axis.

3. The system as recited in claim 2, wherein the second main portion of the second electrode is on the first side of the longitudinal axis spaced laterally apart from the first array of T-shaped sub-electrodes relative to the longitudinal axis, wherein a third main portion of the second electrode is on the second side of the longitudinal axis spaced laterally apart from the second array of T-shaped sub-electrodes relative to the longitudinal axis.

4. The system as recited in claim 3, wherein the first and second electrodes are co-planar and together form a planar structure.

5. The system as recited in claim 3, wherein the T-shaped sub-electrodes and the inductive sub-electrodes are microstructures of the first electrode.

6. The system as recited in claim 5, wherein for every T-shaped sub-electrode of the first electrode, the second electrode includes an opposed T-shaped electrode microstructure extending laterally therefrom relative to the longitudinal axis.

7. The system as recited in claim 6, wherein the second electrode includes a plurality of inductive electrode microstructures extending laterally from the second electrode relative to the longitudinal axis, wherein the plurality of inductive electrode microstructures of the second electrode interdigitate with the T-shaped electrode microstructures of the second electrode to form an alternating pattern with the T-shaped electrode microstructures in a lengthwise direction with respect to the longitudinal axis.

8. The system as recited in claim 7, wherein the plurality of T-shaped electrode microstructures and the plurality of inductive electrode microstructures extend laterally inward from each of the first and second main portions of the second electrode relative to the longitudinal axis.

9. The system as recited in claim 8, wherein each of the T-shaped sub-electrodes includes:

a lateral base extending laterally from the main portion of the first electrode relative to the longitudinal axis; and a terminal cross extending laterally from the lateral base, wherein the lateral base has a first width in a parallel direction that is parallel to the longitudinal axis, and a first length in a lateral direction that is lateral relative to the longitudinal axis, wherein the terminal cross has a second length in the parallel direction and a second width in the lateral direction, wherein the first width and the second width are equal.

10. The system as recited in claim 9, wherein each of the inductive sub-electrodes includes a linear body, extending laterally from the main portion of the first electrode relative to the longitudinal axis, wherein the linear body has a third length in the lateral direction and a third width in the parallel direction, wherein the third length is shorter than the first length, and wherein the third width is equal to the first and second widths.

11. The system as recited in claim 10, wherein adjacent ones of the plurality of T-shaped sub-electrodes are spaced apart from one another by a first gap in the parallel direction.

12. The system as recited in claim 11, wherein each of the inductive sub-electrodes is inside a slot bounded by:

two longitudinal edges of the first main portion of the first electrode, the lateral bases of two adjacent ones of the T-shaped sub-electrodes, a portion of the terminal cross of a first one of the two adjacent ones of the T-shaped sub-electrodes, a portion of the terminal cross of a second one of the two adjacent ones of the T-shaped sub-electrodes, and a second gap between the portions of the terminal crosses of the first and second ones of the two adjacent ones of the T-shaped sub-electrodes.

13. The system as recited in claim 12, wherein each of the T-shaped electrode microstructures includes:

a lateral base extending laterally from one of the second or third main portions of the second electrode relative to the longitudinal axis; and a terminal cross extending laterally from the lateral base, wherein the lateral base has the first width in the parallel direction, and a fourth length in the lateral direction, wherein the fourth length is longer than the first length, and wherein the terminal cross of the T-shaped electrode microstructure has the second width in the parallel direction and the first width in the lateral direction.

14. The system as recited in claim 13, wherein each of the inductive electrode microstructures includes a linear body, extending laterally from one of the second and third main portions of the second electrode relative to the longitudinal axis, wherein the linear body has a fifth length in the lateral direction and the third width in the parallel direction relative to the longitudinal axis, wherein the fifth length is longer than the third length.

15. The system as recited in claim 14, wherein adjacent ones of the plurality of T-shaped electrode microstructures are spaced apart from one another by the first gap in the parallel direction, and wherein each of the inductive electrode microstructures is inside a slot bounded by:

two longitudinal edges of one of the second and third main portions of the second electrode, the lateral bases of two adjacent ones of the T-shaped electrode microstructures, a portion of the terminal cross of a first one of the two adjacent ones of the T-shaped electrode microstructures, a portion of the terminal cross of a second one of the two adjacent ones of the T-shaped electrode microstructures, and a second gap between the portions of the terminal crosses of the first and second ones of the two adjacent ones of the T-shaped electrode microstructures.

16. The system as recited in claim 3, further comprising:

a first Bragg grating structure or 2-dimensional photonic crystal waveguide extending in a parallel direction that is parallel to the longitudinal axis, wherein the first Bragg grating structure or 2-dimensional photonic crystal waveguide is between the first electrode and the second main portion of the second electrode; and a second Bragg grating structure or 2-dimensional photonic crystal waveguide extending in the parallel direction, wherein the second Bragg grating structure or 2-dimensional photonic crystal waveguide is between the first electrode and the third main portion of the second electrode.

17. The system as recited in claim 16, further comprising:

an optical source, wherein respective first ends of each of the first and second Bragg grating structures or 2-dimensional photonic crystal waveguides are an optical input that is optically coupled to the optical source; and an optical device, wherein respective second ends of each of the first and second Bragg grating structures or 2-dimensional photonic crystal waveguides are an optical output that is optically coupled to the optical device.

18. The system as recited in claim 17, further comprising:

an electric signal input module configured to generate electrical signals for modulation of an optical signal from the optical source so the optical device receives a modulated optical signal based on an electrical signal generated by the electrical signal input module; and an electrical circuit electrically connecting the electrical signal input module to the first electrode, and electrically connecting the second electrode to an electrical return or ground, wherein the first and second electrodes are configured to modulate optical signals in the Bragg grating structures or 2-dimensional photonic crystal waveguides based on the electrical signals input thereto from the electric signal input module.

19. The system as recited in claim 3, further comprising:

an electrical transmission line with an electrical signal input electrically connected to a first end of the first electrode relative to the longitudinal axis, and an electrical signal output electrically connected to a second end of the first electrode opposite the first end relative to the longitudinal axis, wherein the first and second electrodes are configured to provide a true delay in an electrical signal from the electrical signal input to the electrical signal output, wherein the second electrode is electrically connected to an electrical return or ground.

20. The system as recited in claim 4, wherein the first and second electrodes are of a metallic material disposed on a planar surface of a semiconductor substrate.

* * * * *